US012661809B2

(12) United States Patent
Liu et al.

(10) Patent No.: US 12,661,809 B2
(45) Date of Patent: Jun. 23, 2026

(54) MINIATURE PARALLEL ROBOT AND FLAT DESIGN MANUFACTURING METHOD

(71) Applicant: ZHEJIANG UNIVERSITY, Zhejiang (CN)

(72) Inventors: Yide Liu, Zhejiang (CN); Bo Feng, Zhejiang (CN); Shaoxing Qu, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 19/230,093

(22) Filed: Jun. 6, 2025

(65) Prior Publication Data

US 2025/0345954 A1     Nov. 13, 2025

Related U.S. Application Data

(63) Continuation of application No. PCT/CN2023/079940, filed on Mar. 6, 2023.

(30) Foreign Application Priority Data

Dec. 8, 2022    (CN) .......................... 202211568273.7

(51) Int. Cl.
     *B25J 19/00*      (2006.01)
     *B25J 9/00*       (2006.01)
     *B25J 9/10*       (2006.01)
(52) U.S. Cl.
     CPC ........... *B25J 19/007* (2013.01); *B25J 9/0054* (2013.01); *B25J 9/106* (2013.01)
(58) Field of Classification Search
     CPC ........ B25J 19/007; B25J 9/0054; B25J 9/106; B25J 9/0051; B25J 9/08; B25J 9/003
     See application file for complete search history.

(56) References Cited

U.S. PATENT DOCUMENTS

| | | | | |
|---|---|---|---|---|
| 11,433,559 | B2 * | 9/2022 | Sun ............................ | B25J 9/08 |
| 2003/0056364 | A1 * | 3/2003 | Morita ................. | B25J 17/0266 |
| | | | | 29/700 |

(Continued)

FOREIGN PATENT DOCUMENTS

| | | |
|---|---|---|
| CN | 114619424 | 6/2022 |
| CN | 115570598 | 1/2023 |

(Continued)

OTHER PUBLICATIONS

Hamid D. Taghirad, "Parallel Robots Mechanics and Control", CRC Press, Feb. 20, 2013, pp. 1-7.

(Continued)

*Primary Examiner* — Khoi H Tran
*Assistant Examiner* — Tristan J Greiner
(74) *Attorney, Agent, or Firm* — JCIPRNET

(57) ABSTRACT

A miniature parallel robot and a flat design manufacturing method, relating to the field of robots. A direction perpendicular to a fixed platform is used as a longitudinal direction and a direction parallel to the fixed platform is used as a transverse direction; the overall structure of a miniature parallel robot to be manufactured is divided in both the longitudinal direction and the transverse direction; then linkage units obtained by the division are manufactured on the basis of a flat machining process; and finally, the linkage units are recombined by re-assembly to obtain a final miniature parallel robot. The present invention simplifies the design process of the miniature parallel robot, and can be conveniently applied to different complex parallel robots (having more than three branches). Additionally, the miniature parallel robot designed and manufactured by means of the method has high precision, high rigidity, and high dynamic performance.

14 Claims, 12 Drawing Sheets

(56)          References Cited

U.S. PATENT DOCUMENTS

| | | |
|---|---|---|
| 2005/0132837 A1 | 6/2005 | Ben Horin et al. |
| 2013/0205932 A1* | 8/2013 | Fukudome ........... B25J 17/0266 |
| | | 901/27 |
| 2014/0202628 A1* | 7/2014 | Sreetharan ............ B32B 37/144 |
| | | 156/290 |
| 2017/0030514 A1 | 2/2017 | Kurose et al. |
| 2021/0114200 A1 | 4/2021 | Lescano et al. |
| 2025/0058841 A1* | 2/2025 | Liu ........................ B62D 57/02 |

FOREIGN PATENT DOCUMENTS

| | | |
|---|---|---|
| JP | H10138177 | 5/1998 |
| RU | 2679260 | 2/2019 |
| WO | 2015120977 | 8/2015 |

OTHER PUBLICATIONS

Yide Liu et al., "S2worm: A Fast-Moving Untethered Insect-Scale Robot With 2-DoF Transmission Mechanism", IEEE Robotics and Automation Letters, Jul. 2022, pp. 6758-6765, vol. 7, No. 3.
Kaushik Jayaram et al., "Scaling down an insect-size microrobot, HAMR-VI into HAMR-Jr", 2020 IEEE International Conference on Robotics and Automation (ICRA), Mar. 6, 2020, pp. 1-7.
"International Search Report (Form PCT/ISA/210) of PCT/CN2023/079940," mailed on Aug. 31, 2023, with English translation thereof, pp. 1-6.

* cited by examiner a)                              b)

c)

d)                              e)

a)

b)

c)

a)

b)

a)

b)

a)

b)

c)

a)

b)

MINIATURE PARALLEL ROBOT AND FLAT DESIGN MANUFACTURING METHOD

CROSS-REFERENCE TO RELATED APPLICATION

The present application is a continuation of international application of PCT application No. PCT/CN2023/079940 filed on Mar. 6, 2023, which claims the priority benefit of China application No. 202211568273.7 filed on Dec. 8, 2022. The entirety of each of the above-mentioned patent applications is incorporated herein by reference and made a part of this specification.

TECHNICAL FIELD

The invention relates to the field of robots, and specifically relates to a miniature parallel robot and a flat design manufacturing method.

DESCRIPTION OF RELATED ART

A parallel robot generally refers to a closed-loop kinematic chain mechanism whose moving platform is connected to the base by several independent kinematic chains (Hamid D. Taghirad. PARALLEL ROBOTS MECHANICS AND CONTROL ISBN 987-7-111-58859-7).

Miniature parallel robots generally refer to parallel robots with sizes below 5 cm, so they have higher precision and better dynamic response capability compared to large parallel robots. However, due to the limitations of scale requirements, the design and manufacturing of miniature parallel robots cannot be achieved through conventional methods. At present, integrated flat design manufacturing methods are generally adopted for the miniature parallel robots. However, when miniature parallel robots have small sizes and numerous and complex multi-parallel kinematic chain structures, it is difficult to process and manufacture the miniature parallel robots using the manufacturing methods of the related art.

Therefore, how to achieve the processing and manufacturing of miniature parallel robots is a technical problem that urgently needs to be solved at present.

SUMMARY OF INVENTION

The object of the invention is to solve the problem in the related art that the design of miniature parallel robots is subject to size limitations, making it difficult to process and manufacture complex multi-parallel kinematic chain structures, and to provide a miniature parallel robot and a flat design manufacturing method.

The specific technical solutions adopted by the disclosure are provided as follows.

In the first aspect, the invention provides a flat design manufacturing method of a miniature parallel robot. The miniature parallel robot includes a fixed platform, a moving platform, and a kinematic chain connecting the two platforms, and the kinematic chain is formed by a plurality of branches. The following steps are included:

In S1, a direction perpendicular to the fixed platform is treated as a longitudinal direction and a direction parallel to the fixed platform is treated as a transverse direction, and an overall structure of the miniature parallel robot to be manufactured is divided in both the longitudinal direction and the transverse direction. The overall structure forms a plurality of assembly units after being divided in the longitudinal direction, each assembly unit includes at least one branch, and each assembly unit is disconnected at a non-joint position of the branch after being divided in the transverse direction and forms at least two linkage units.

In S2, flat machining is performed on solid components of each linkage unit divided from the overall structure to obtain a linkage component corresponding to each linkage unit. Each linkage component has a multi-layer flat composite structure with a flexible flat material layer as a middle layer and rigid flat material layers on outermost two sides. The flexible flat material layer and the rigid flat material layers are fixed through adhesive material layers. A joint contained in the linkage component has a linear rotation axis, and a joint position is connected only by the flexible flat material layer. The rigid flat material layer on each side is discontinuous and disconnected at the linear rotation axis, and the rigid flat material layers on both sides of a disconnection position are mutually engaged through serrated edges. Between two adjacent linkage components having a splicing relationship in the overall structure, connection structures that can be paired and connected are provided at splicing positions thereof.

In S3, all linkage components are assembled according to positional relationships thereof in the overall structure to obtain the miniature parallel robot.

As a preferred embodiment of the first aspect, the number of the assembly units formed after the longitudinal direction division of the overall structure is at least 1 and at most does not exceed the number of the branches in the kinematic chain.

As a preferred embodiment of the first aspect, the number of the assembly units formed after the longitudinal direction division of the overall structure is equal to the number of the branches in the kinematic chain, and each assembly unit contains only one branch.

As a preferred embodiment of the first aspect, a longitudinal dividing plane used for the longitudinal direction division passes through centers of the fixed platform and the moving platform, and all assembly units formed after division have completely identical structures.

As a preferred embodiment of the first aspect, the number of the linkage units formed after transverse direction division of each assembly unit is at least 2, and at most does not exceed the number of the joints on a single branch.

As a preferred embodiment of the first aspect, the number of the linkage units formed after transverse direction division of each assembly unit is 2 or 3.

As a preferred embodiment of the first aspect, the disconnection positions when all assembly units are divided in the transverse direction are completely identical.

As a preferred embodiment of the first aspect, when each assembly unit is divided in the transverse direction, a distance between the disconnection position and a nearest joint is not less than 2 mm, and the disconnection position is preferably located in a middle of a linkage.

As a preferred embodiment of the first aspect, the paired connection structures between the two adjacent linkage components are connected through embedded insertion. An embedded insertion structure includes a male connector and a female connector adopting the multi-layer flat composite structure. In protruding portions of the rigid flat material layers on both sides of the male connector, a projection of the rigid flat material layer on one side on a plane is a portion of a projection of the rigid flat material layer on the other side on the plane. A slotted portion of the female connector and the protruding portions of the male connector are exactly embedded and fitted at the rigid flat material layers on both sides. Flat patterns of the male connector and the female connector are able to prevent the two from separating each other when subjected to reverse external forces in a flat direction.

As a preferred embodiment of the first aspect, the paired connection structure between the two adjacent linkage components are connected by an auxiliary component insertion method. Each of the two connection structures is provided with a slot, and connection and fixation are achieved through an auxiliary component that can be inserted into both the slots of the two connection structures.

As a preferred embodiment of the first aspect, the paired connection structure between the two adjacent linkage components are connected by an adhesive bonding method. The two connection structures are bonded and overlapped through rigid flat material layers thereof on one side, and bonding surfaces between the two linkage components are adhesively fixed through pre-flat machining bonding or post-flat machining bonding. The pre-flat machining bonding is achieved by directly arranging adhesive material layers on the bonding surfaces during a machining process of the two linkage components. The post-flat machining bonding is achieved by pre-opening flow channels that allow glue to be uniformly injected into the bonding surfaces during the machining process of the two linkage components, and then the glue is injected into the bonding surfaces along the flow channels during an assembly process of the two processed linkage components to achieve bonding.

As a preferred embodiment of the first aspect, the flexible flat material layer is preferably a flexible polymer film, a flexible gel layer, a flexible textile fabric, or a flexible metal foil, and more preferably a polyimide film with a thickness of 40 um to 60 um.

As a preferred embodiment of the first aspect, the rigid flat material layer is preferably a rigid metal plate, a rigid plastic plate, a rigid glass plate, a rigid resin plate, a rigid wood plate, or a rigid composite material plate, and more preferably twill bidirectional woven carbon fiber with a thickness of 400 um to 600 um.

As a preferred embodiment of the first aspect, a material of the auxiliary component is preferably aluminum oxide ceramic, and a thickness is further preferably 400 um to 600 um.

As a preferred embodiment of the first aspect, an additive manufacturing method or a subtractive manufacturing method is a machining method of the flat machining. The additive manufacturing method includes one or more of 3D printing, printing, spraying, extrusion, and chemical synthesis. The subtractive manufacturing method includes one or more of cutting, wire cutting, laser ablation, photolithography, and chemical etching.

As a preferred embodiment of the first aspect, when all linkage components are assembled to form the miniature parallel robot, each linkage component in each assembly unit is assembled first to form assembly components, and each assembly component is then assembled to form a final miniature parallel robot.

As a preferred embodiment of the first aspect, the miniature parallel robot is a Sarrus robot, a Delta parallel robot, or an X4 parallel robot.

In the second aspect, the invention provides a miniature parallel robot. The miniature parallel robot includes a fixed platform, a moving platform, and a kinematic chain connecting the two platforms, and the kinematic chain is formed by a plurality of branches. With a direction perpendicular to the fixed platform as a longitudinal direction and a direction parallel to the fixed platform as a transverse direction, the miniature parallel robot is divided in the longitudinal direction into a plurality of assembly components. Each assembly component includes at least one branch. Each assembly component is divided in the transverse direction into at least two linkage components that are disconnected at a non-joint position of the branch.

Each linkage component has a multi-layer flat composite structure with a flexible flat material layer as a middle layer and rigid flat material layers on both sides of the middle layer. The flexible flat material layer and the rigid flat material layers are bonded and fixed together. A joint contained in the linkage component has a linear rotation axis, and a joint position is connected only by the flexible flat material layer. The rigid flat material layer on each side is discontinuous and disconnected at the linear rotation axis, and the rigid flat material layers on both sides of a disconnection position are mutually engaged through serrated edges.

The miniature parallel robot is formed by splicing various linkage components, and two adjacent linkage components having a splicing relationship contain paired connection structures at the splicing positions thereof.

As a preferred embodiment of the second aspect, the miniature parallel robot is designed and manufactured by the flat design manufacturing method according to any one of the first aspect.

As a preferred embodiment of the second aspect, the miniature parallel robot is a Sarrus robot, a Delta parallel robot, or an X4 parallel robot.

Compared to the related art, the disclosure exhibits the following beneficial effects:

Based on the flat manufacturing process, the invention provides a design manufacturing method of a miniature parallel robot utilizing disassembly and re-assembly means and may be used to manufacture miniature parallel robots with complex overall structures (with more than three branches). The introduction of this method simplifies the design process of a miniature parallel robot, and this method may be conveniently applied to various complex parallel robots. Further, the miniature parallel robot designed and manufactured through this method exhibits high precision, high rigidity, and high dynamic performance.

DESCRIPTION OF EMBODIMENTS

Figure 1:
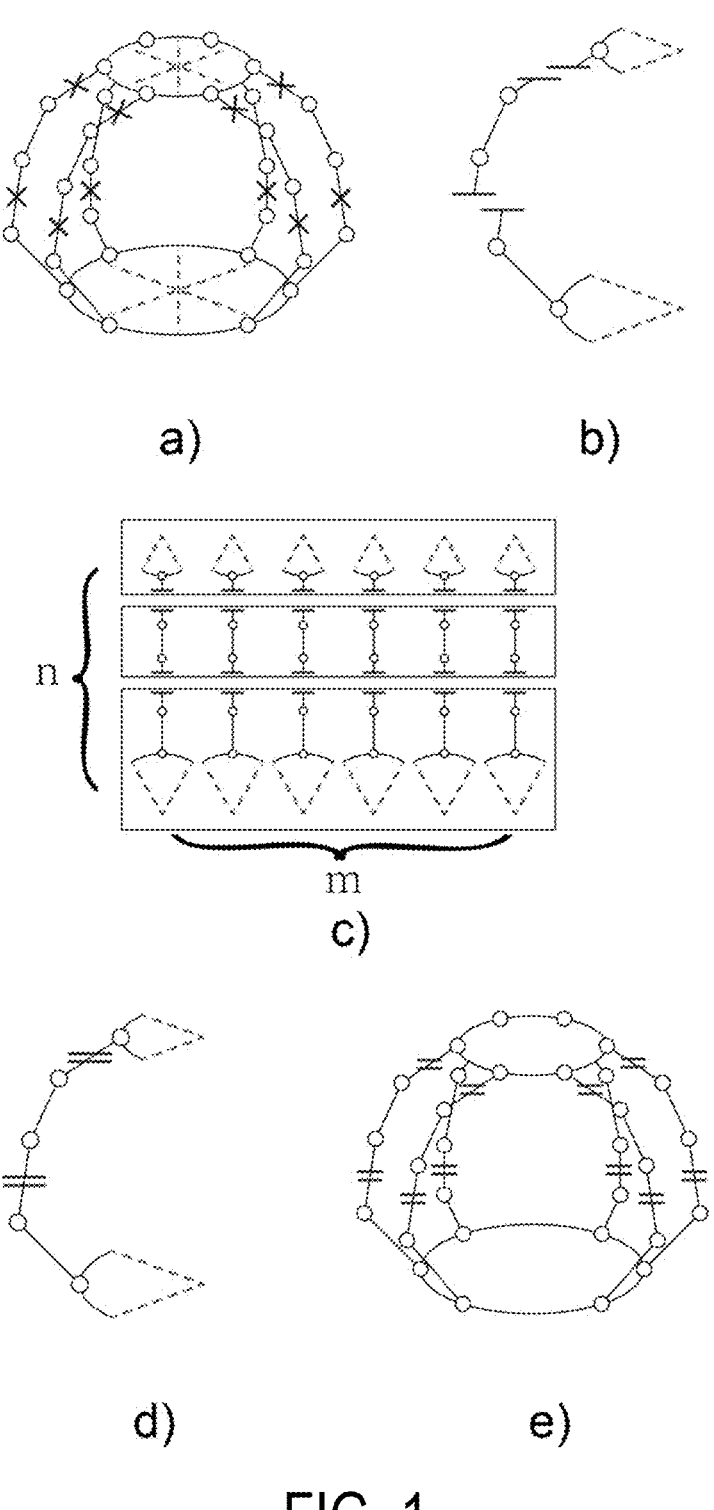
FIG. 1 is a schematic view of steps of a flat design manufacturing method of a miniature parallel robot.

In order to make the above objects, features and advantages of the invention more clearly understood, the specific embodiments of the invention will be described in detail below with reference to the accompanying drawings. In the following description, numerous specific details are set forth in order to provide a thorough understanding of the invention. However, the invention can be implemented in many other ways than those described herein, and a person having ordinary skill in the art can make similar modifications without departing from the meaning of the invention. Accordingly, the invention is not limited by the specific examples disclosed below. The technical features in the various embodiments of the disclosure may be combined accordingly as long as they do not conflict with each other.

In the description of the invention, it should be understood that when an element is referred to as being "connected" to another element, it may be directly connected to the other element or indirectly connected, i.e., intervening elements are present. Conversely, when an element is referred to as being "directly" connected to another element, no intervening elements are present.

In the description of the invention, it should be understood the terms "first" and "second" are only used for differentiating and descriptive purposes and cannot be understood as indicating or implying relative importance or implicitly indicating the number of indicated technical features. Thus, the features defined with "first" and "second" may explicitly or implicitly include at least one of these features.

In a preferred embodiment of the invention, a flat design manufacturing method for a miniature parallel robot is provided. The miniature parallel robot includes a fixed platform, a moving platform, and a kinematic chain connecting the two platforms, and the kinematic chain is formed by a plurality of branches. As shown in a) of FIG. 1, an exemplary structure view of a miniature parallel robot is illustrated, where a bottom portion is the fixed platform, a top portion is the moving platform, and the fixed platform and the moving platform are connected through 6 branches. Each branch has joints necessary for the robot to move. The number of the joints needs to be adjusted according to actual needs. In a) of FIG. 1, each branch has 5 joints, where the two joints at both ends are used for being connected to the fixed platform and the moving platform.

In the invention, for ease of description, a fixed platform surface of the parallel robot is used as a reference plane, and two directions are defined, where a direction perpendicular to the fixed platform is defined as a longitudinal direction, and a direction parallel to the fixed platform is defined as a transverse direction.

Therefore, the flat design manufacturing method includes the following steps:

In step 1, an overall structure of the miniature parallel robot to be manufactured is divided in both the longitudinal direction and the transverse direction. The overall structure forms a plurality of assembly units after being divided in the longitudinal direction, each assembly unit includes at least one branch, and each assembly unit is disconnected at a non-joint position of the branch after being divided in the transverse direction and forms at least two linkage units.

It should be noted that in the invention, when dividing the overall structure of the miniature parallel robot, the two directions are not limited to the order of division. The longitudinal direction division may be performed first and then the transverse direction division, the transverse direction division may be performed first and then the longitudinal direction division, or the longitudinal direction division and the transverse direction division may be performed at the same time. When performing the longitudinal direction division and the transverse direction division, the overall structure may be divided into different sub-structures through dividing planes. For ease of description, the dividing plane during longitudinal direction division is referred to as a longitudinal dividing plane, and the dividing plane during transverse direction division is referred to as a transverse dividing plane.

In the invention, the purpose of dividing the overall structure of the miniature parallel robot is to decompose the robot into linkage units. The linkage units are subsequently used as minimum processing objects of physical components, and the miniature parallel robot is then formed by reassembling each linkage unit. The design and manufacturing difficulty of the miniature parallel robot with a complex structure is thereby lowed.

It should be noted that the assembly units in the invention are formed by the longitudinal direction division of the overall structure, and therefore, the three parts: the fixed platform, the branches, and the moving platform are included. The linkage units formed by the transverse direction division of the assembly units all need to be disconnected at non-joint positions of the linkages, so each linkage unit contains partial linkages, while the linkage units at both ends also include partial fixed platform or moving platform.

For ease of description, the number of the assembly units obtained by dividing the overall structure of the miniature parallel robot in the longitudinal direction is denoted as m, and the number of the linkage units obtained by dividing in the transverse direction is denoted as n.

The number m of the assembly units formed after the longitudinal direction division of the overall structure and division positions need to comprehensively evaluated in terms of the difficulty of assembly, structural strength, and machinability, with an optional range of $1 \leq m \leq a$, where a represents the number of the branches in the kinematic chain connecting the moving platform and the fixed platform. Preferably m-a, so that each assembly unit contains only one branch. Further, the longitudinal direction division method may adopt uniform or non-uniform division of the fixed platform and moving platform along centers, with uniform division being preferred, whereby the longitudinal dividing plane passes through the centers of the fixed platform and moving platform. All assembly units formed after division have completely identical structures. However, it should be noted that the statement that all assembly units have completely identical structures refers to the requirement that each assembly unit must be kept completely identical when dividing the overall structure during the design stage. However, when specifically processing the corresponding assembly units, the two assembly units need to be individually processed into solid components, and if the solid components adopt subsequent embedded and inserted structure, the two assembly units may have certain differences at the joint positions due to the differences between male and female connectors.

The number n of the linkage units formed after each assembly unit is divided in the transverse direction and the division position of the overall structure should comprehensively consider the assembly difficulty, structural strength, and machinability, and its optional range is 2≤n≤b, where b represents the number of the joints on a single branch, and preferably, n=2 or 3. Theoretically, different assembly units may each be divided in the transverse direction, and the numbers and positions of their divisions may be different. However, since the branches of the miniature parallel robots are often the same, they may be divided through several identical transverse dividing planes. Therefore, disconnection positions of all assembly units between two transverse dividing planes during transverse direction division are completely the same, so that branch units at the same position on different branches may be processed together. The disconnection position during the transverse direction division of the assembly units needs to consider assembly and structural stability, and a distance from adjacent joints should preferably be no less than 2 mm. That is, the disconnection position is selected within the range where the distance from both ends of the linkage exceeds 2 mm. It is preferred to disconnect at a middle of a linkage, and it is not acceptable to disconnect at joint positions.

Taking the robot structure in a) of FIG. 1 as an example, m=6 and n=3 are set, divided into 6 assembly units in total, and each assembly unit contains 1 branch. As shown in b) of FIG. 1, each assembly unit is further divided into 3 linkage units through two transverse dividing planes. The 6 assembly units have the same structure and the disconnection positions of all assembly units between the two transverse dividing planes are also completely the same during the transverse direction division. Therefore, the 6 linkage units above the first transverse dividing plane have the same structure and may be processed together, the 6 linkage units between the first transverse dividing plane and the second transverse dividing plane have the same structure and may be processed together, and the 6 linkage units below the third transverse dividing plane have the same structure and may be processed together.

In step 2, flat machining is performed on solid components of each linkage unit divided from the overall structure to obtain a linkage component corresponding to each linkage unit. Each linkage component has a multi-layer flat composite structure with a flexible flat material layer as a middle layer and rigid flat material layers on outermost two sides. The flexible flat material layer and the rigid flat material layers are fixed through adhesive material layers. A joint contained in the linkage component has a linear rotation axis, and a joint position is connected only by the flexible flat material layer. The rigid flat material layer on each side is discontinuous and disconnected at the linear rotation axis, and the rigid flat material layers on both sides of the disconnection position are mutually engaged through serrated edges. Between two adjacent linkage components having a splicing relationship in the overall structure, connection structures that can be paired and connected are provided at splicing positions thereof.

It should be noted that the assembly units and the linkage units obtained by division in the step 1 above are merely divisions at the design level, mainly to provide a basis for the processing of the solid components in this step. The solid components obtained after processing each linkage unit are called the linkage components. Before processing, it is necessary to determine a size of each linkage unit of the miniature parallel robot, and then flat designing, processing, and manufacturing are performed on all linkage units of the miniature parallel robot according to its mechanism principles and division method.

In the invention, a flat machining process is adopted for the solid components. The flat machining refers to the processing methods for flat materials, including but not limited to additive manufacturing methods such as 3D printing, printing, spraying, extrusion, and chemical synthesis, or subtractive manufacturing methods such as cutting, wire cutting, laser ablation, photolithography, and chemical etching. The flat materials refer to plate-like or layered materials whose thickness is generally much smaller than (at least one order of magnitude) their length and width.

In the invention, by performing the flat machining on flat materials and combining with an adhesive manufacturing process, an intelligent composite material in the form of a multi-layer composite flat structure may be formed. In the multi-layer composite flat structure, the middle layer is the flexible flat material layer, and the outermost two sides are the rigid flat material layers. The flexible flat material layer and the rigid flat material layers are fixed through the adhesive material layers. The rigid flat material includes but not limited to a rigid metal plate, a rigid plastic plate, a rigid glass plate, a rigid resin plate, a rigid wood plate, a rigid composite material plate (e.g., a rigid carbon fiber plate), etc. The flexible flat material includes but not limited to a flexible polymer film, a flexible gel layer, a flexible textile fabric, a flexible metal foil, etc. The adhesive material layers may adopt forms such as adhesives, glue, or heat-press adhesive tapes.

After this composite material undergoes flat machining, the rigid flat material layers in the intelligent composite material sandwich the flexible flat material layer, and the rigid flat material layers on both sides may be linearly disconnected at joint positions, while the intermediate flexible flat material layer remains continuous. Therefore, a linear rotation axis is formed. This linear rotation axis is a straight-line rotational mechanism connected through the flexible flat material layer. The rigid flat material layers on both sides may utilize the flexible flat material layer to rotate along the linear rotation axis after the flat machining and division to obtain degrees of freedom of movement, so that the rotational degrees of freedom required for robot joints is formed. Moreover, to ensure that this joint position may only rotate without other forms of translational degrees of freedom, edges of the rigid flat material layers on both sides of the disconnection position along the linear rotation axis need to be processed into serrated edges, and then the rigid flat material layers with the serrated edges are mutually engaged along the linear rotation axis. Since the rigid flat material layers on each side of the flexible flat material layer are engaged through serrations at joint positions, there are no translational degrees of freedom between them, but the rotational degrees of freedom around the linear rotation axis are not affected. Based on linkage components formed by processing the intelligent composite material, the degrees of freedom of movement of devices may be further three-dimensionally designed as needed, so that different moving functions may be achieved.

Figure 2:
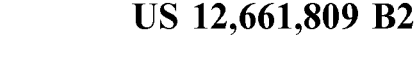
FIG. 2 is a schematic view of an exemplary linkage component.

An exemplary linkage component is shown in FIG. 2, where a first material layer 1 and a fifth material layer 5 are rigid flat materials, a second material layer 2 and a fourth material layer 4 are adhesive materials, and a third material layer 3 is a flexible flat material. The dashed box indicates a division boundary obtained after the rigid flat materials undergo flat machining and division, and the dashed line is the linear rotation axis along which the rigid flat materials rotate along the division boundary using the flexible flat material. Both layers of rigid flat materials are divided and disconnected along the linear rotation axis and are fitted through the serrated staggered arrangement.

In addition, since the linkage components in the invention need to be subsequently spliced and recombined into the miniature parallel robot, connection structures need to be reserved when processing the aforementioned linkage components. Specifically, the connection structures need to be provided at respective splicing positions of two adjacent linkage components that have a splicing relationship in the overall structure, and the linkage structures of the two linkage components need to be paired and connected. Since the linkage components are processed from the aforementioned intelligent composite material in the form of the multi-layer composite flat structure, the connection structures are also obtained through extension or slotting processing of this composite material.

In the invention, in order to adapt to the connection needs of different linkage positions, different linkage components may adopt different connection structure forms. Therefore, different connection methods are designed, which are mainly divided into two categories: adhesive bonding and insertion. The insertion connection method includes two types: embedded insertion and auxiliary component insertion. The adhesive bonding connection method may be divided into two types according to different adhesive media: pre-flat machining bonding and post-flat machining bonding. The insertion connection method is used for fixing between a side surface of a flat material and a side surface (a surface formed by length and thickness or a surface formed by width and thickness), and the adhesive bonding connection method is used for fixing between a flat material surface and a surface (a surface formed by length and width). Each of these is described in detail in the following paragraphs.

1. In the first connection method, the paired connection structures between two adjacent linkage components are connected by embedded insertion, and an embedded insertion structure includes a male connector and a female connector that adopt the multi-layer flat composite structure. Herein, in protruding portions of the rigid flat material layers on both sides of the male connector, a projection of the rigid flat material layer on one side on a plane is a portion of a projection of the rigid flat material layer on the other side on the plane. A slotted portion of the female connector and the protruding portions of the male connector are exactly embedded and fitted at the rigid flat material layers on both sides. Moreover, flat patterns of the male connector and the female connector are able to prevent the two from separating from each other when subjected to reverse external forces in a flat direction.

The aforementioned embedded insertion requires processing mutually embeddable geometric structures on the parts of the miniature parallel robot to ensure the insertion connection of different parts. For ease of description, the rigid flat material layers on both sides of the flexible flat material layer are referred to as an upper layer and a lower layer. As such, an upper layer structure pattern of the embedded male connector portion should encompass a lower layer structure pattern. That is, the lower layer structure of a male connector embedded boundary is a subset of the upper layer structure. A lower layer structure of the embedded female connector portion should encompass the upper layer structure pattern. That is, the upper layer structure of a female connector embedded boundary is a subset of the lower layer. In an example, FIG. 3 contains three sub-figures a), b), and c), where a) is a front isometric view, b) is a rear isometric view, and c) is a front isometric view after the embedding is completed. Herein, a first part 6 is the upper layer structure of the male connector, a second part 7 is the lower layer structure of the male connector, a third part 8 is the upper layer structure of the female connector, and a fourth part 9 is the lower layer structure of the female connector. Geometric boundary shapes of the first part 6 and the third part 8 as well as the second part 7 and the fourth part 9 are mutually embeddable. The structure patterns of the second part 7 and the fourth part 9 are subsets of the structure patterns of the first part 6 and the third part 8. Such a design may ensure the firmness and reliability of the embedded structure.

Figure 3:
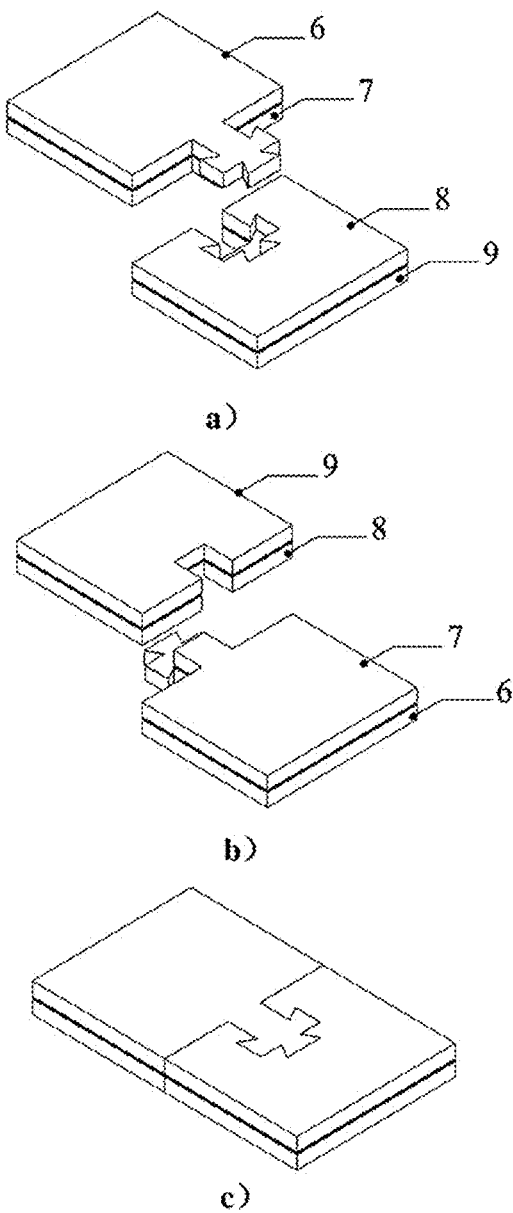
FIG. 3 is a schematic view of a first connection method of the linkage component.

It should be noted that in order to prevent the male connector and female connector from separating from each other when subjected to reverse external forces in the flat direction, the flat patterns of the male connector and female connector cannot be straight strips or other patterns that would cause separation. The general pattern design principle requires arrangement of protruding portions and recessed portions on the side edges of both. Through the fitting of the protruding portions and the recessed portions, the male connector and the female connector are prevented from separating from each other when subjected to reverse external forces in the flat direction. In FIG. 3, a protruding portion and a recessed portion are provided on the left and right sides.

2. In the second connection method, the paired connection structures between the two adjacent linkage components are connected by an auxiliary component insertion method for connection. Each of the two connection structures is provided with a slot, and connection and fixation are achieved through an auxiliary component that may be inserted into both the slots of the two connection structures.

Figure 4:
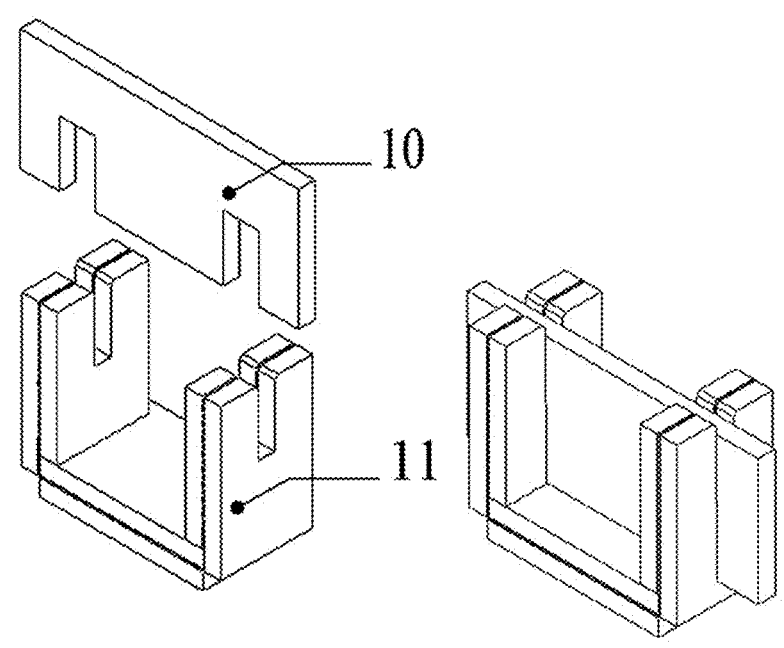
FIG. 4 is a schematic view of a second connection method of the linkage component.

This auxiliary component insertion method requires creating insertion slots on the parts of the miniature parallel robot to facilitate the insertion of the auxiliary components, and the connection between the linkage units or the assembly units is ensured through the matching between the auxiliary components and the insertion slots. In an example, the fifth part 10 in FIG. 4 is an auxiliary sheet, and the sixth part 11 is an end portion of the linkage component to be connected. A material of the auxiliary sheet is not limited, as long as it has sufficient strength to be matched with and inserted into the end portion of the linkage component. Aluminum oxide ceramic is preferably used as an insertion component, with a preferred thickness of 400 um to 600 um.

3. In the third connection method, the paired connection structures between the two adjacent linkage components are connected by adhesive bonding. The two connection structures are bonded and overlapped through rigid flat material layers thereof on one side, and bonding surfaces between the two linkage components are adhesively fixed through pre-flat machining bonding or post-flat machining bonding.

3.1. Pre-flat machining bonding: adhesive material layers are directly arranged on the bonding surfaces during a machining process of the two linkage components.

The adhesive material layer process may be directly implemented in the flat machining process, and may adopt forms such as glue or hot-press tape to directly achieve adhesive fixation during the flat design manufacturing process of parts.

3.2. Post-flat machining bonding: flow channels that allow glue to be uniformly injected into the bonding surfaces during the machining process of the two linkage components are pre-opened, and then the glue is injected into the bonding surfaces along the flow channels during an assembly process of the two processed linkage components to achieve bonding.

Figure 5:
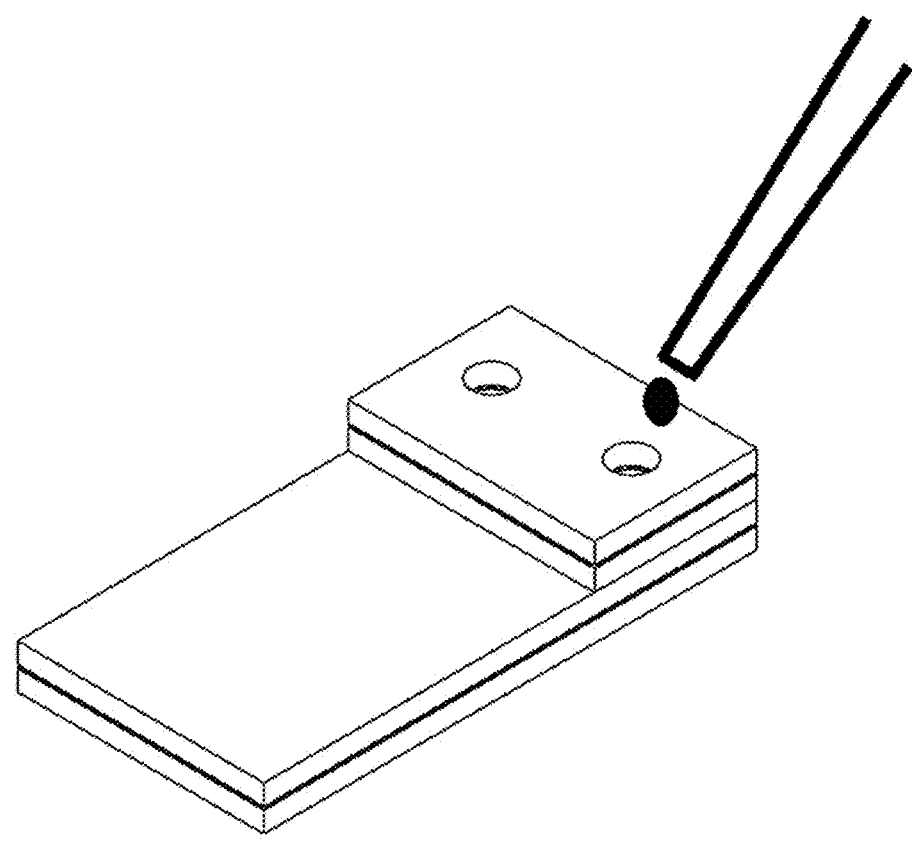
FIG. 5 is a schematic view of a third connection method of the linkage component.

This flat machining followed by bonding requires flow channel design for the parts of the miniature parallel robot, so as to ensure that the glue is evenly distributed through the flow channels at a parting interface to achieve bonding and fixation of the parting interface. For instance, in an example, as shown in FIG. 5, a plurality of holes extending to the bonding surface may be made on an upper layer plate at locations requiring bonding, and dripping the glue into the holes may make the glue evenly distributed on the bonding surfaces of the upper layer and lower layer plates, so that a reliable connection effect is ensured.

Taking the robot structure in a) of FIG. 1 as an example, 6 assembly units may be processed in a flat manner together. The linkage units at the same position in each assembly unit are processed in a flat manner together and then cut, as shown in c) of FIG. 1, and the connection structure is provided on each linkage unit, as shown in d) of FIG. 1.

In step 3, all linkage components are assembled according to positional relationships thereof in the overall structure to obtain the miniature parallel robot.

Taking the robot configuration in a) of FIG. 1 as an example, the 6 assembly units may first be assembled individually and then assembled in the transverse direction to form the overall robot as shown in e) of FIG. 1.

It should be noted that there are no restrictions on the assembly sequence principle for assembling all linkage components to form the miniature parallel robot, as long as the overall robot may be finally assembled. In the invention, considering the reliability and simplicity of assembly, each linkage component in each assembly unit may be assembled first to form the assembly component, and then each assembly component may be assembled to form the final miniature parallel robot. During this assembly process, the above three different connection methods may be used to connect and fix the corresponding linkage units. For the linkage components that are connected through the embedded insertion method, according to the designed geometric structure, the two linkage components are fixed together by pressing. For the connection structures that are connected through the auxiliary component insertion method, the auxiliary component is inserted into the designed insertion slot on the linkage component to complete the fixation between assembly units. For the linkage components adopting the post-flat machining bonding, glue is dropped into the flow channels of the parts to achieve bonding of the bonding surfaces. For the connection structures of the linkage components adopting the pre-flat machining bonding, double-sided tape may be directly used to achieve bonding.

Based on the above flat design manufacturing method of the miniature parallel robot, the invention simplifies the design process of the miniature parallel robot through disassembly, re-assembly, and modular design manufacturing, so as to design and manufacture complex miniature parallel robots. The miniature parallel robot manufactured by this method includes the fixed platform, the moving platform, and the kinematic chain connecting the two platforms, and the kinematic chain is composed of several branches. Particularly, with the direction perpendicular to the fixed platform as the longitudinal direction and the direction parallel to the fixed platform as the transverse direction, the miniature parallel robot is divided into several assembly components in the longitudinal direction, and each assembly component includes at least one branch. Each assembly component is divided in the transverse direction into at least two linkage components that are disconnected at non-joint positions of the branch.

Each linkage component has a multi-layer flat composite structure with a flexible flat material layer as the middle layer and rigid flat material layers on both sides of the middle layer. The flexible flat material layer and the rigid flat material layers are bonded and fixed together. The joint contained in the linkage component has a linear rotation axis, and the joint position is connected only by the flexible flat material layer. The rigid flat material layer on each side is discontinuous and disconnected at the linear rotation axis, and the rigid flat material layers on both sides of the disconnection position are mutually engaged through serrated edges.

The miniature parallel robot is formed by splicing various linkage components, and two adjacent linkage components having a splicing relationship contain paired connection structures at the splicing positions thereof.

The miniature parallel robot that may be designed and manufactured in the invention includes but not limited to a Sarrus robot, a Delta parallel robot, or an X4 parallel robot, and the number of the branches may exceed 3. The following shows the specific practices of different parallel robots applying the above flat design manufacturing method of the miniature parallel robot through several embodiments.

Embodiment 1

Figure 6:
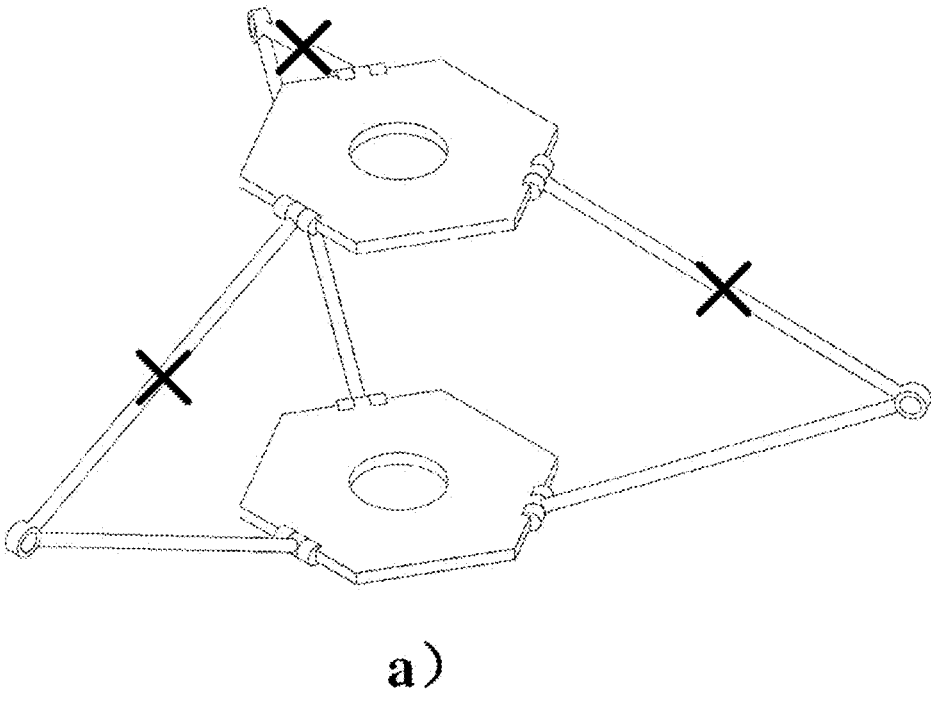
FIG. 6 is a schematic view of a first step of a robot flat design manufacturing flow process in Embodiment 1.
Figure 6:
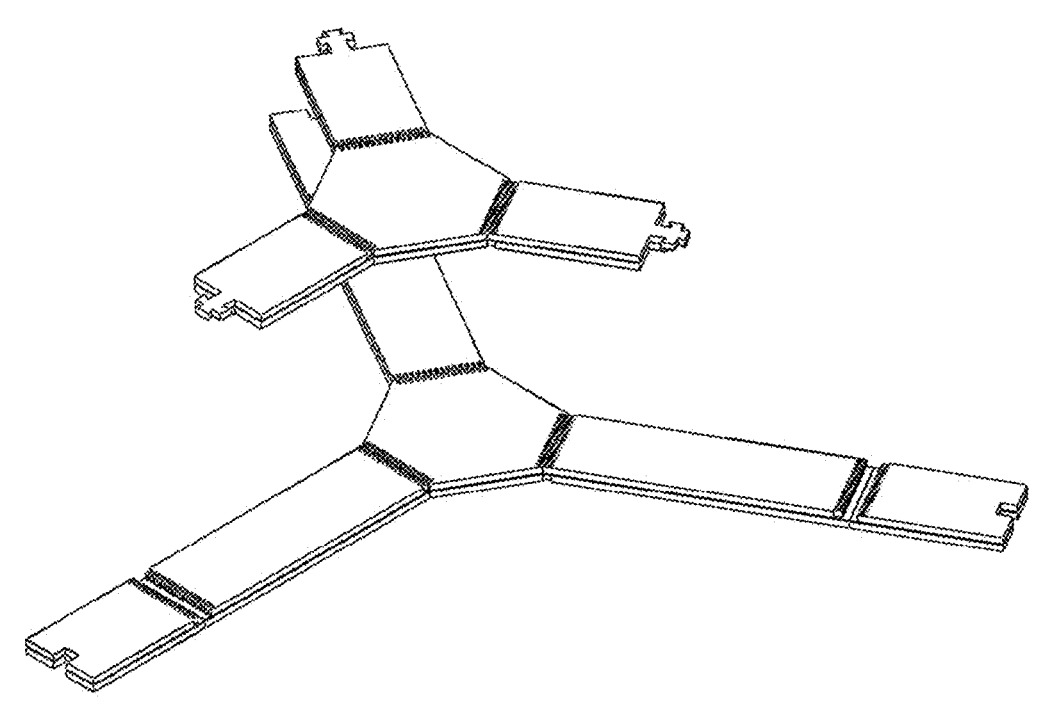

In step 1, a Sarrus robot (a single-degree-of-freedom parallel robot with at least two branches, and the number of the branches is three in this embodiment) is selected as the target for miniaturization design and manufacturing. The robot is divided in the longitudinal direction into 1 assembly unit, and each assembly unit is divided in the transverse direction into 2 linkage units, i.e., m=1 and n=2. The specific division scheme is shown in a) of FIG. 6, and the solid components obtained by processing according to the divided units are shown in b) of FIG. 6.

Figure 7:
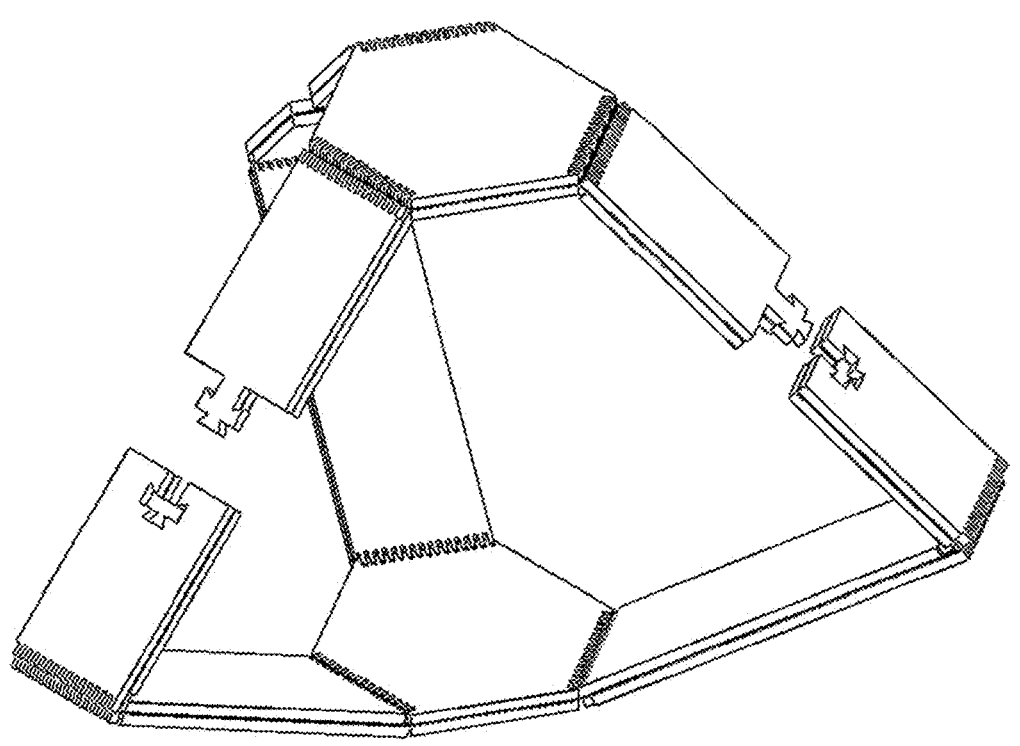
FIG. 7 is a schematic view of a second step of the robot flat design manufacturing flow process in Embodiment 1.

In step 2, the embedded insertion connection method is adopted at the dividing locations in the transverse direction, as shown in FIG. 7.

Figure 8:
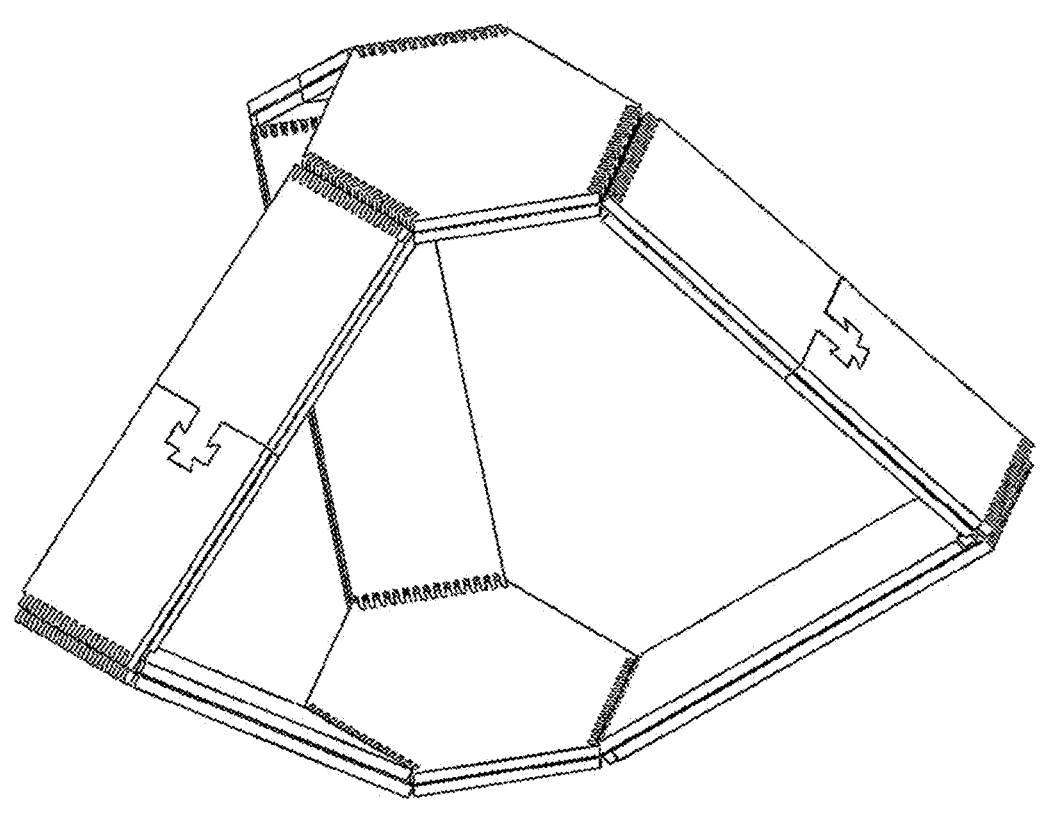
FIG. 8 is a schematic view of a third step of the robot flat design manufacturing flow process in Embodiment 1.

In step 3, the assembly components are engaged together by pressing, as shown in FIG. 8.

Embodiment 2

Figure 9:
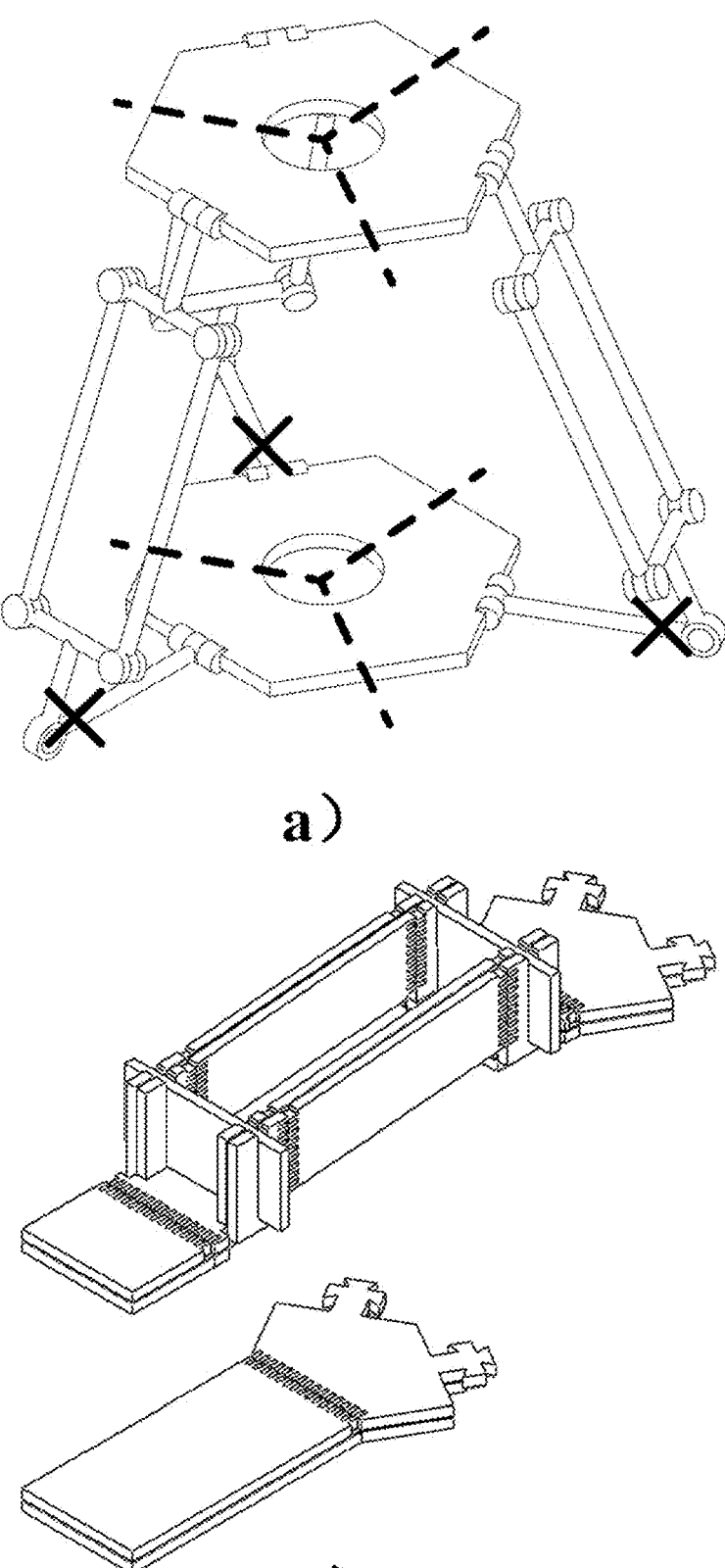
FIG. 9 is a schematic view of a first step of a robot flat design manufacturing flow process in Embodiment 2.

In step 1, a Delta parallel robot (a three-degree-of-freedom parallel robot with three branches) is selected as the target for miniature design and manufacturing. The parallel robot is divided into 3 assembly units in the longitudinal direction, and each assembly unit is divided into 2 parts in the transverse direction, i.e., m=3 and n=2. The specific division scheme is shown in a) of FIG. 9, and the solid components obtained by processing according to the divided units are shown in b) of FIG. 9.

Figure 10:
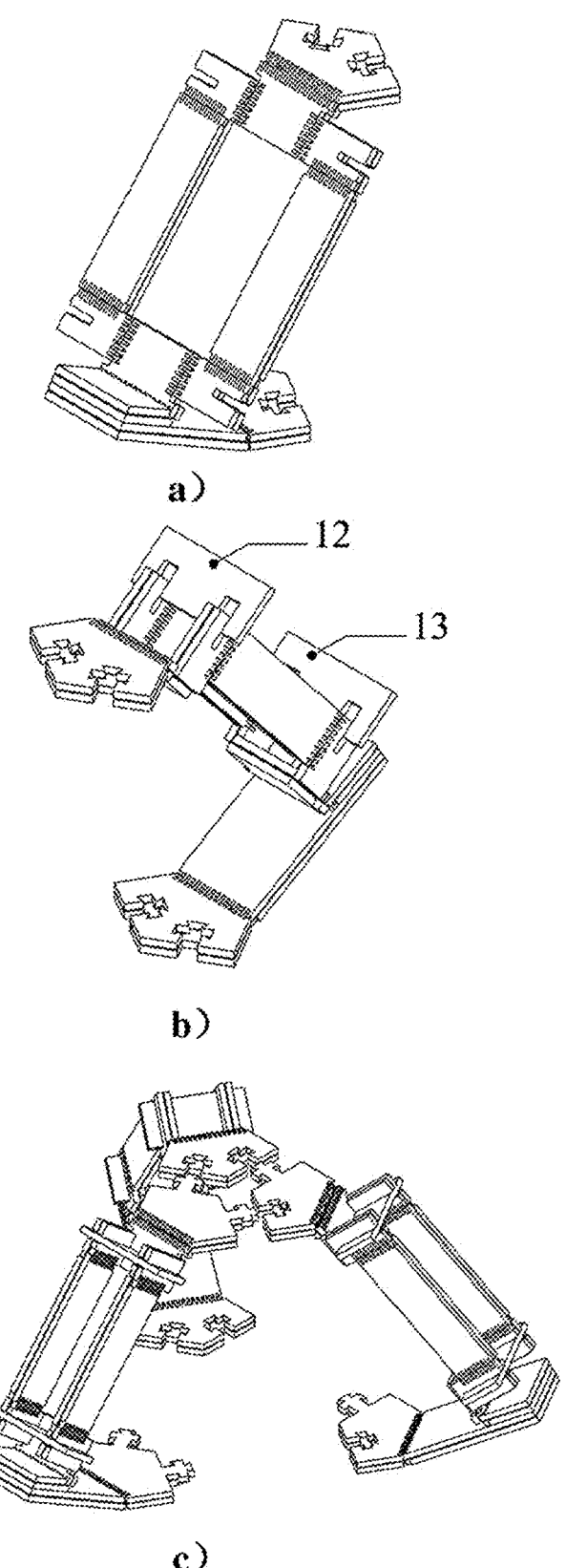
FIG. 10 is a schematic view of a second step of the robot flat design manufacturing flow process in Embodiment 2.

In step 2, at the dividing location in the transverse direction, the pre-flat machining bonding method is adopted, and the parts of the Delta parallel robot at the dividing location in the transverse direction are bonded by using double-sided tape. The parallel four linkages included in the assembly unit adopt the auxiliary component insertion method, and a first auxiliary component 12 and a second auxiliary component 13 are used to fix the positions of the parallel four linkages. The embedded insertion method is adopted at the dividing location in the longitudinal direction for connection. The components before insertion and after insertion are shown in a) and b) of FIG. 10 respectively, and the overall structure after all three components are inserted is shown in c) of FIG. 10.

Figure 11:
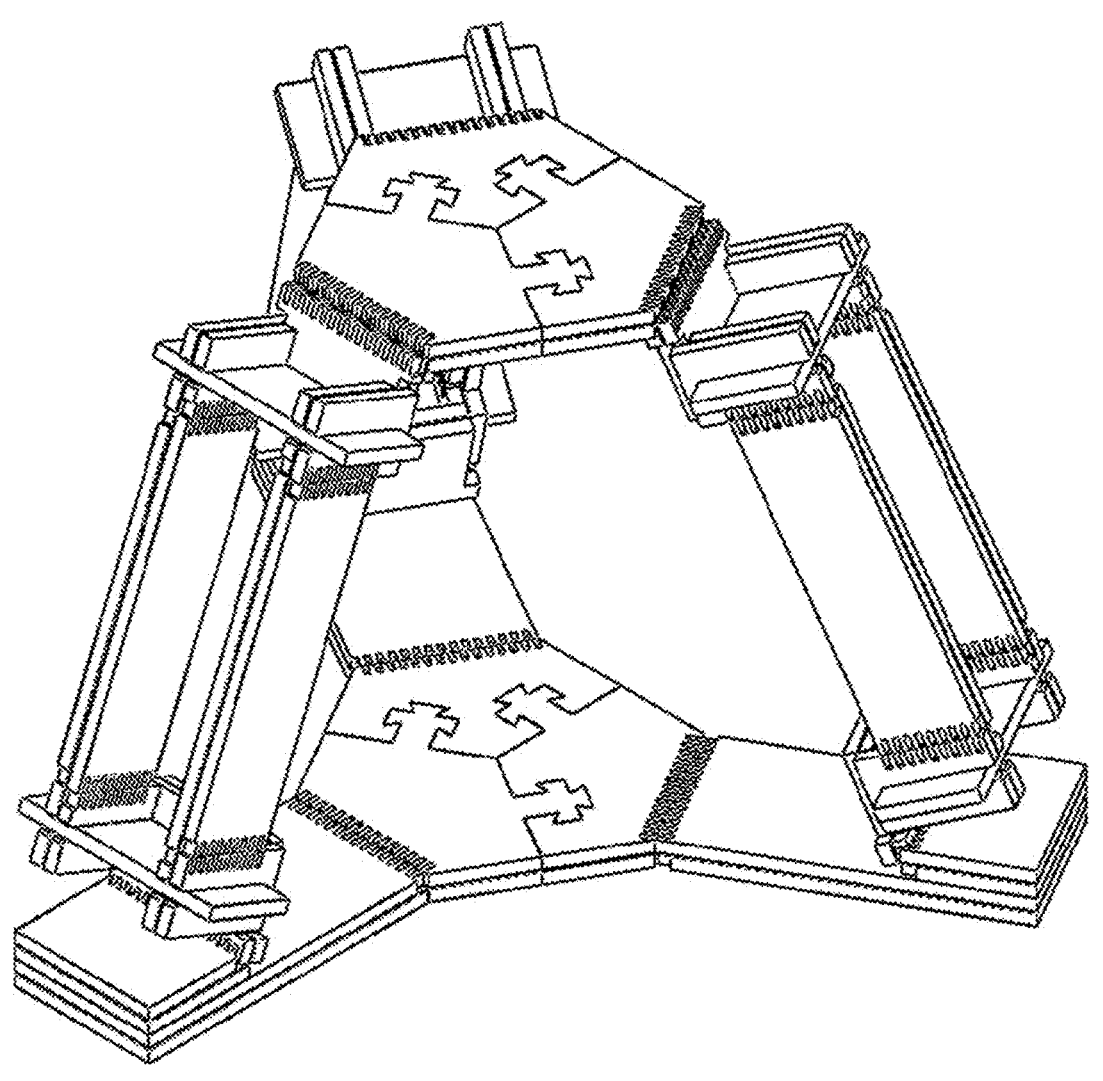
FIG. 11 is a schematic view of a third step of the robot flat design manufacturing flow process in Embodiment 2.

In step 3, the branches at the dividing location in the longitudinal direction are embedded together by pressing, as shown in FIG. 11.

Embodiment 3

Figure 12:
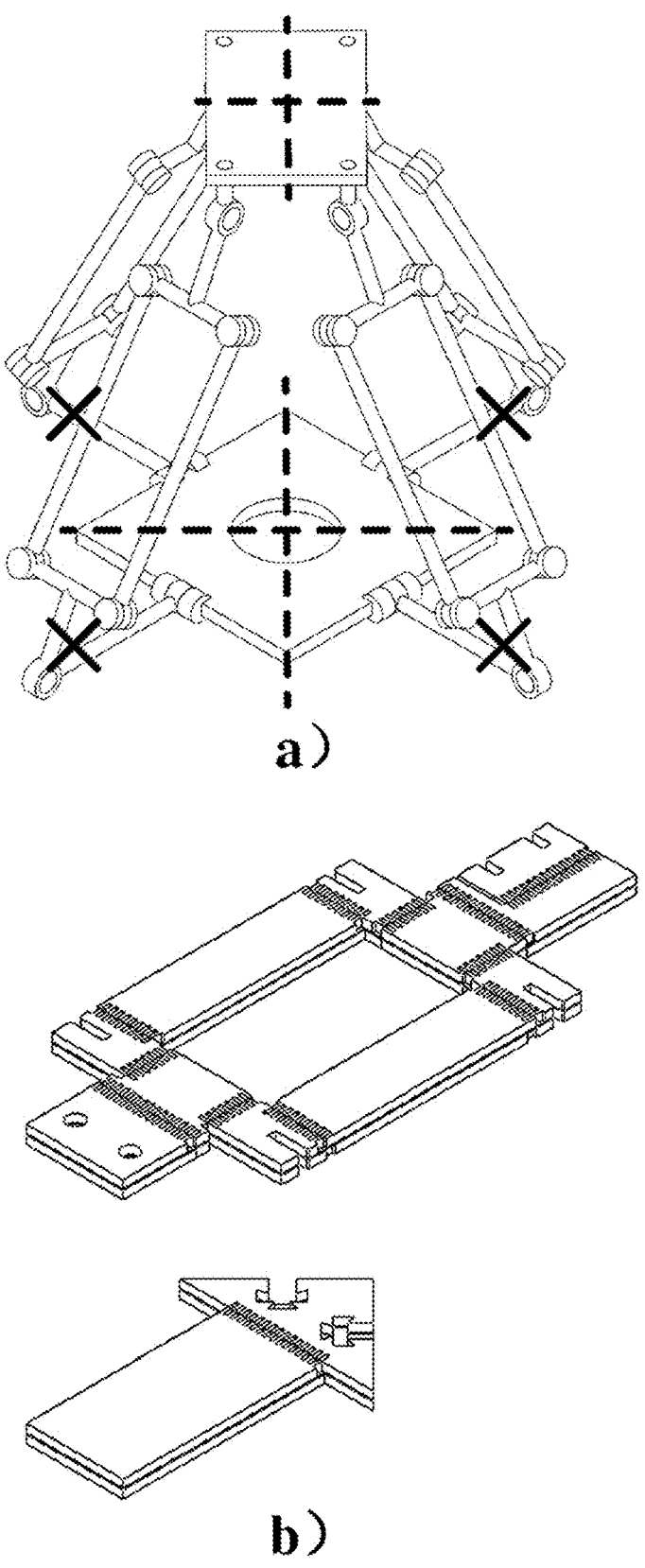
FIG. 12 is a schematic view of a first step of a robot flat design manufacturing flow process in Embodiment 3.

In step 1, an X4 parallel robot (a four-degree-of-freedom parallel robot with four branches) is selected as the target for miniature design and manufacturing. The parallel robot is divided into 4 assembly units in the longitudinal direction, and each assembly unit is divided into 2 parts in the transverse direction, i.e., m=4 and n=2. The specific division scheme is shown in a) of FIG. 12, and the solid components obtained by processing according to the divided units are shown in b) of FIG. 12.

Figure 13:
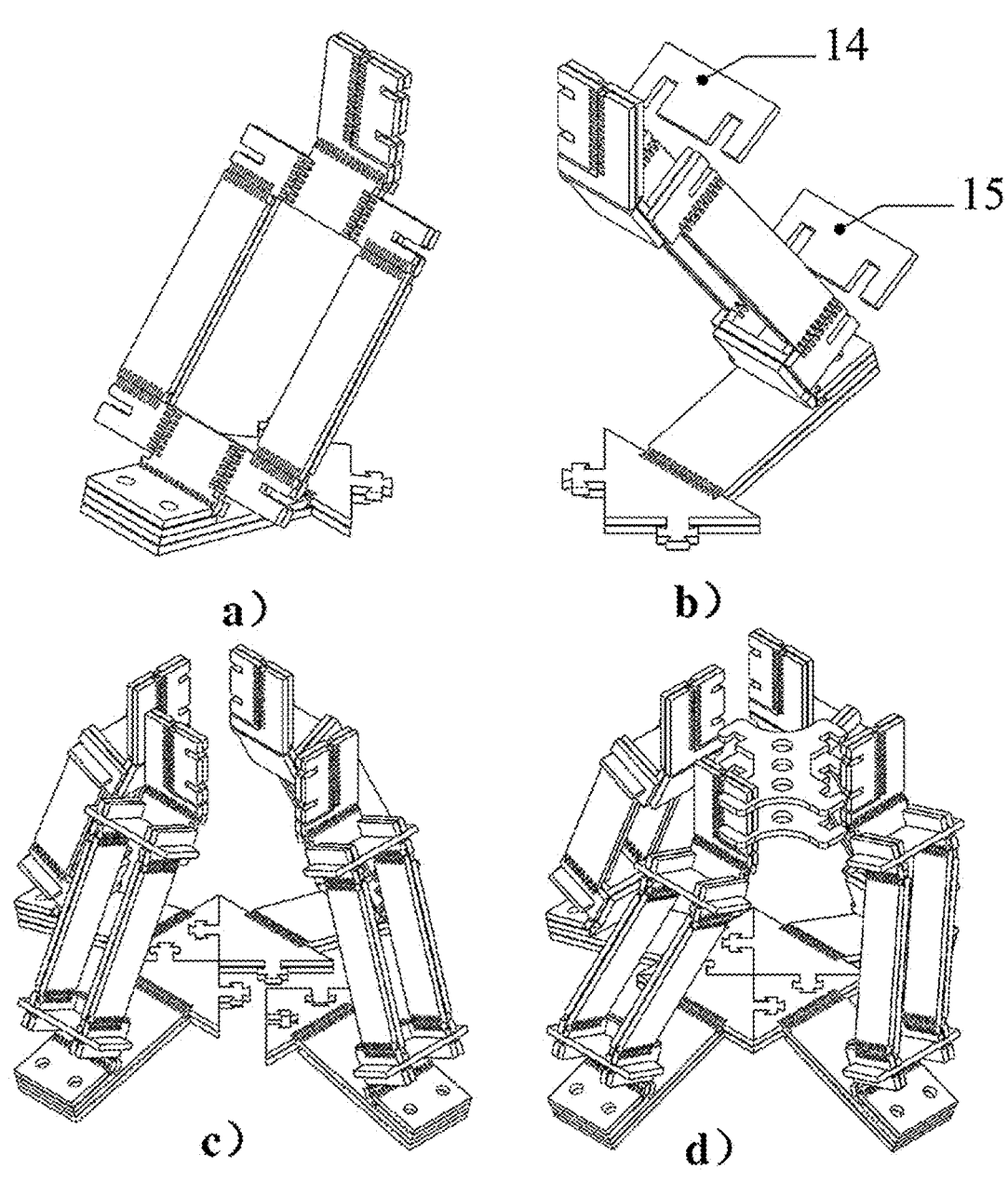
FIG. 13 is a schematic view of a second step of the robot flat design manufacturing flow process in Embodiment 3.

In step 2, at the dividing location in the transverse direction, the post-flat machining bonding method is adopted, and the parts of the Delta parallel robot at the dividing location in the transverse direction are bonded by using glue. The parallel four linkages included in the assembly unit adopt the auxiliary component insertion method, and a third auxiliary component 14 and a fourth auxiliary component 15 are used to fix the positions of the parallel four linkages. The embedded insertion method and the auxiliary component insertion method are adopted at the dividing location in the longitudinal direction for connection. The components before auxiliary component insertion and after auxiliary component insertion are shown in a) and b) of FIG. 13 respectively, and the inserted components before and after the embedded insertion are shown in c) and d) of FIG. 13.

Figure 14:
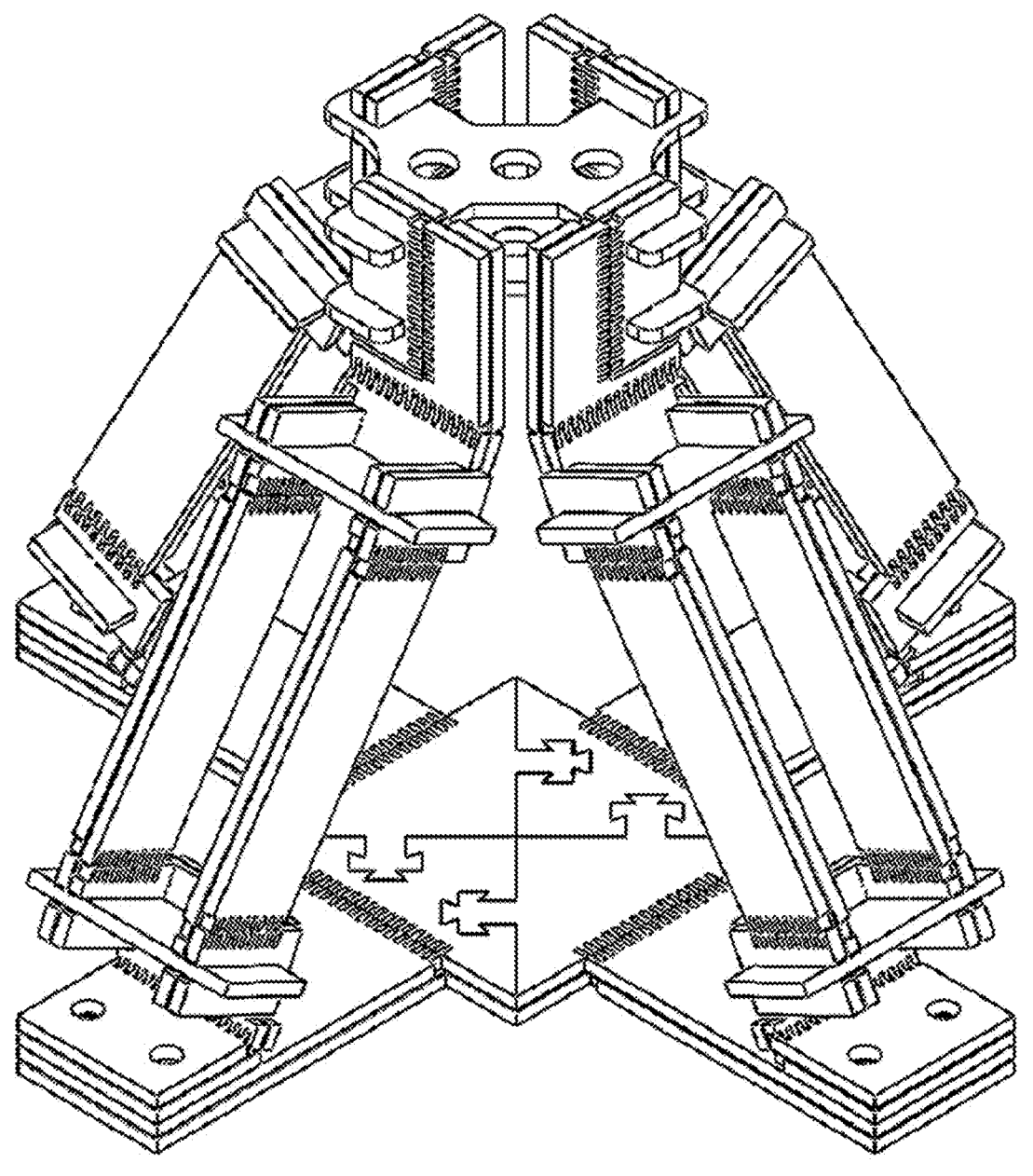
FIG. 14 is a schematic view of a third step of the robot flat design manufacturing flow process in Embodiment 3.

In step 3, the fixed platform portions of the branches at the dividing locations in the longitudinal direction are pressed and engaged together to form the assembly components through pressing, and the 4 assembly components are assembled into a whole through insertion components, as shown in FIG. 14.

The above-described embodiments are only preferred solutions of the disclosure, but the embodiments are not intended to limit the disclosure. A person having ordinary skill in the art can also make various changes and modifications without departing from the spirit and scope of the disclosure. Therefore, any technical solutions obtained by equivalent substitution or equivalent transformation fall within the protection scope of the disclosure.

What is claimed is:

1. A flat design manufacturing method of a miniature parallel robot fixed platform, the miniature parallel robot comprising a fixed platform, a moving platform, and a kinematic chain connecting the two platforms, the kinematic chain formed by a plurality of branches, comprising the following steps:

S1: treating a direction perpendicular to the fixed platform as a longitudinal direction and a direction parallel to the fixed platform as a transverse direction and dividing an overall structure of the miniature parallel robot to be manufactured in both the longitudinal direction and the transverse direction, wherein the overall structure forms a plurality of assembly units after being divided in the longitudinal direction, each assembly unit comprises at least one branch, and each assembly unit is disconnected at a non-joint position of the branch after being divided in the transverse direction and forms at least two linkage units;

S2: performing flat machining on solid components of each linkage unit divided from the overall structure to obtain a linkage component corresponding to each linkage unit, wherein each linkage component has a multi-layer flat composite structure with a flexible flat material layer as a middle layer and rigid flat material layers on outermost two sides, the flexible flat material layer and the rigid flat material layers are fixed through adhesive material layers, a joint contained in the linkage component has a linear rotation axis, a joint position is connected only by the flexible flat material layer, the rigid flat material layer on each side is discontinuous and disconnected at the linear rotation axis, the rigid flat material layers on both sides of a disconnection position are mutually engaged through serrated edges, and between two adjacent linkage components having a splicing relationship in the overall structure, connection structures that can be paired and connected are provided at splicing positions thereof; and S3: assembling all linkage components according to positional relationships thereof in the overall structure to obtain the miniature parallel robot.

2. The flat design manufacturing method of the miniature parallel robot according to claim 1, wherein the number of the assembly units formed after longitudinal direction division of the overall structure is equal to the number of the branches in the kinematic chain, and each assembly unit contains only one branch.

3. The flat design manufacturing method of the miniature parallel robot according to claim 1, wherein a longitudinal dividing plane used for the longitudinal direction division passes through centers of the fixed platform and the moving platform, and all assembly units formed after division have completely identical structures.

4. The flat design manufacturing method of the miniature parallel robot according to claim 1, wherein the number of the linkage units formed after transverse direction division of each assembly unit is at least 2, and at most does not exceed the number of the joints on a single branch.

5. The flat design manufacturing method of the miniature parallel robot according to claim 1, wherein when each assembly unit is divided in the transverse direction, a distance between the disconnection position and a nearest joint is not less than 2 mm, and the disconnection position is located in a middle of a linkage.

6. The flat design manufacturing method of the miniature parallel robot according to claim 1, wherein the paired connection structures between the two adjacent linkage components are connected through embedded insertion, an embedded insertion structure comprises a male connector and a female connector adopting the multi-layer flat composite structure, in protruding portions of the rigid flat material layers on both sides of the male connector, a projection of the rigid flat material layer on one side on a plane is a portion of a projection of the rigid flat material layer on the other side on the plane, a slotted portion of the female connector and the protruding portions of the male connector are exactly embedded and fitted at the rigid flat material layers on both sides, and flat patterns of the male connector and the female connector are able to prevent the two from separating each other when subjected to reverse external forces in a flat direction.

7. The flat design manufacturing method of the miniature parallel robot according to claim 1, wherein the paired connection structure between the two adjacent linkage components are connected by an auxiliary component insertion method, each of the two connection structures is provided with a slot, and connection and fixation are achieved through an auxiliary component that can be inserted into both the slots of the two connection structures.

8. The flat design manufacturing method of the miniature parallel robot according to claim 1, wherein the paired connection structure between the two adjacent linkage components are connected by an adhesive bonding method, the two connection structures are bonded and overlapped through rigid flat material layers thereof on one side, bonding surfaces between the two linkage components are adhesively fixed through pre-flat machining bonding or post-flat machining bonding, the pre-flat machining bonding is achieved by directly arranging adhesive material layers on the bonding surfaces during a machining process of the two linkage components, the post-flat machining bonding is achieved by pre-opening flow channels that allow glue to be uniformly injected into the bonding surfaces during the machining process of the two linkage components, and then the glue is injected into the bonding surfaces along the flow channels during an assembly process of the two processed linkage components to achieve bonding.

9. The flat design manufacturing method of the miniature parallel robot according to claim 1, wherein the flexible flat material layer is a flexible polymer film, a flexible gel layer, a flexible textile fabric, or a flexible metal foil.

10. The flat design manufacturing method of the miniature parallel robot according to claim 1, wherein the rigid flat material layer is a rigid metal plate, a rigid plastic plate, a rigid glass plate, a rigid resin plate, a rigid wood plate, or a rigid composite material plate.

11. The flat design manufacturing method of the miniature parallel robot according to claim 1, wherein an additive manufacturing method or a subtractive manufacturing method is adopted as a machining method of the flat machining, the additive manufacturing method comprises one or more of 3D printing, printing, spraying, extrusion, and chemical synthesis, and the subtractive manufacturing method comprises one or more of cutting, wire cutting, laser ablation, photolithography, and chemical etching.

12. The flat design manufacturing method of the miniature parallel robot according to claim 1, wherein when all linkage components are assembled to form the miniature parallel robot, each linkage component in each assembly unit is assembled first to form assembly components, and each assembly component is then assembled to form a final miniature parallel robot.

13. A miniature parallel robot, the miniature parallel robot comprising a fixed platform, a moving platform, and a kinematic chain connecting the two platforms, the kinematic chain formed by a plurality of branches, wherein, with a direction perpendicular to the fixed platform as a longitudinal direction and a direction parallel to the fixed platform as a transverse direction, the miniature parallel robot is divided in the longitudinal direction into a plurality of assembly components, each assembly component comprises at least one branch, each assembly component is divided in the transverse direction into at least two linkage components that are disconnected at a non-joint position of the branch, each linkage component has a multi-layer flat composite structure with a flexible flat material layer as a middle layer and rigid flat material layers on both sides of the middle layer, the flexible flat material layer and the rigid flat material layers are bonded and fixed together, a joint contained in the linkage component has a linear rotation axis, a joint position is connected only by the flexible flat material layer, the rigid flat material layer on each side is discontinuous and disconnected at the linear rotation axis, the rigid flat material layers on both sides of a disconnection position are mutually engaged through serrated edges, and the miniature parallel robot is assembled from various linkage components, and between two adjacent linkage components having a splicing relationship, connection structures that are paired and connected are provided at splicing positions thereof.

14. The miniature parallel robot according to claim 13, wherein the miniature parallel robot is a Sarrus robot, a Delta parallel robot, or an X4 parallel robot.

* * * * *